(12) United States Patent
Sumi

(10) Patent No.: US 6,590,632 B2
(45) Date of Patent: Jul. 8, 2003

(54) IMAGE RECORDING METHOD AND IMAGE RECORDING APPARATUS

(75) Inventor: Katsuto Sumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/977,970

(22) Filed: Oct. 17, 2001

(65) Prior Publication Data

US 2002/0044265 A1 Apr. 18, 2002

(30) Foreign Application Priority Data

Oct. 17, 2000 (JP) ........................................ 2000-316622

(51) Int. Cl.[7] ...................... G03B 27/62; G03B 27/52; G03B 27/00
(52) U.S. Cl. ............................. 355/47; 355/40; 355/18
(58) Field of Search ............................ 355/18, 40–41, 355/47, 52; 347/116, 159, 250; 358/299, 471

(56) References Cited

U.S. PATENT DOCUMENTS 5,049,901 A * 9/1991 Gelbart ........................ 346/108
5,978,010 A * 11/1999 Hosokawa ................... 347/250
6,081,316 A * 6/2000 Okamura et al. ............. 355/18
6,151,099 A * 11/2000 Okamura et al. ............. 355/47
6,208,369 B1 * 3/2001 Oren et al. ................... 347/244

FOREIGN PATENT DOCUMENTS

EP 0992350 A1 4/2000

* cited by examiner

Primary Examiner—Henry Hung Nguyen
(74) Attorney, Agent, or Firm—Sughrue Mion, PLLC

(57) ABSTRACT

The image recording method and apparatus focus or image a two-dimensional image formed by a group of two-dimensionally disposed light source elements through an optical system on a recording medium which is moving in a relative relation to the group two-dimensionally disposed light source elements. The method and apparatus deflect light from the group of two-dimensionally disposed light source elements to move the image focused on the recording medium in synchronism with a movement of the recording medium such that the image can remain stationary at least in a main scanning direction in a relative relation to the recording medium. The group of two-dimensionally disposed light source elements can be produced by a two-dimensional spatial light modulator illuminated with an illumination light flux.

11 Claims, 3 Drawing Sheets

IMAGE RECORDING METHOD AND IMAGE RECORDING APPARATUS

BACKGROUND OF THE INVENTION

The present invention relates to the technical field of an image recording method and an image recording apparatus, and more particularly, to an image recording system using a light modulator of two-dimensional arrangement (two-dimensional spatial light modulator) such as a micro mirror array or a two-dimensional mirror array device.

Mainly used in a digital image exposure system utilized in various types of printers is a so-called laser beam scan exposure (raster scan) for two-dimensionally exposing a recording medium with a laser beam modulated in accordance with an image to be recorded by deflecting the laser beam in a main scanning direction while relatively moving the recording medium and an optical system in an auxiliary scanning direction perpendicular to the main scanning direction.

In contrast, recently, various types of digital image exposure systems have been proposed which use two-dimensional spatial light modulators such as a liquid crystal display (hereinafter, referred to as "LCD") and the micro mirror array (hereinafter, referred to as "MMA") or the two-dimensional mirror array device (2DMAD) which is commercially available, for example, as a Digital Micromirror Device™ (DMD) manufactured by Texas Instruments Inc. that are utilized as display devices in displays, monitors and so on. In the exposure systems, a recording medium is basically exposed by forming an image displayed by the two-dimensional spatial light modulator on the recording medium.

In particular, the MMA is advantageous in exposure at high speed because the MMA has a modulation speed (response speed) faster than that of the LCD and moreover utilizes light more efficiently than the LCD.

Digital exposure systems using the spatial light modulator are disclosed in, for example, U.S. Pat. No. 5,049,901 and EP 0992350 A1.

The digital exposure systems disclosed in these publications each relate to an image recording apparatus in which an image is formed on a spatial light modulator such as the MMA in the form of an image signal and the image signal is imaged on a recording medium for recording. In the digital exposure systems, the image on the spatial light modulator is moved in synchronism with the movement of the recording medium which is moved in a main scanning direction so that the image can remain stationary on the recording medium. This operation enables image recording of high resolution by obtaining a small recording light spot from an extended light source which has difficulty in narrowing the area.

The principle of an image recording method using the conventional spatial light modulator will be described with reference to FIGS. 3A, 3B and 3C. As shown in FIG. 3A, light impinges on a spatial light modulator 90 and is reflected by a mirror 90a, and the reflected light is imaged onto a recording medium 94 through an optical system such as a lens 92. It is assumed that the recording medium 94 moves at a constant speed as shown by an arrow in FIGS. 3A to 3C. In FIG. 3A, only the mirror 90a is activated and mirrors 90b and 90c are deactivated, and only the light reflected by the mirror 90a is imaged onto the recording medium 94.

Next, when the recording medium 94 slightly moves as shown in FIG. 3B, the mirror 90a in the spatial light modulator 90 is deactivated and only the mirror 90b is activated instead in synchronism with the movement of the recording medium 94, and the same point on the recording medium 94 as shown in FIG. 3A is exposed to the light reflected by the mirror 90b.

Further, when the recording medium 94 moves as shown in FIG. 3C, only the mirror 90c is activated in the spatial light modulator 90 in synchronism with the movement of the recording medium 94 and images at the same position on the recording medium 94.

As described above, in the illustrated example, the spatial light modulator 90 changes image signaling three times so that each of the mirrors 90a, 90b and 90c exposes the recording medium 94 once, in total three times. As a result, the image is moved in synchronism with the movement of the recording medium 94 so as to remain stationary on the recording medium 94.

As described above, however, when the image on the spatial light modulator is moved to cause the image to remain stationary on the recording medium, the image is moved with respect to the continuously moving recording medium by using the array-like discrete modulator such as the MMA. Thus, the image discontinuously moves on the modulator and is dragged by the pitch of one pixel on the recording medium. As a result, a problem arises in that an image larger than that of one pixel in the MMA is formed, which results in increase of the pixel size of the recorded image.

Further, another problem also arises in that a complicated signal processing circuit is necessary to move the image on the spatial light modulator so as to cause the image to remain stationary on the recording medium.

SUMMARY OF THE INVENTION

An object of the present invention, which was made in view of the above conventional problems, is to provide an image recording method which can overcome the problem of the increase in pixel size in image recording with a light modulator of two-dimensional arrangement and which enables image recording of high resolution using a large (broad) area light source without the need for a complicated signal processing circuit.

Another object of the present invention is to provide an image recording apparatus for implementing the image recording method as described above.

In order to attain the object described above, the first aspect of the present invention provides an image recording method in which a two-dimensional image formed by a group of two-dimensionally disposed light source elements is focused through an optical system on a recording medium which is moving in a relative relation to the group of two-dimensionally disposed light source elements, comprising the step of: deflecting light from the group of two-dimensionally disposed light source elements to move the image focused on the recording medium in synchronism with a movement of the recording medium such that the image can remain stationary at least in a main scanning direction in a relative relation to the recording medium.

Preferably, the group of two-dimensionally disposed light source elements is produced by a two-dimensional spatial light modulator illuminated with an illumination light flux.

In order to attain the object described above, the second aspect of the present invention provides an image recording apparatus, comprising: a group of two-dimensionally disposed light source elements; a recording medium which moves in a relative relation to the group of two-dimensionally disposed light source elements; and an optical system which focuses an image formed by the group of two-dimensionally disposed light source elements on the recording medium, wherein the optical system includes a light deflector for deflecting light from the group of two-dimensionally disposed light source elements, and the light deflector deflects the light to move the image focused on the recording medium in synchronism with a movement of the recording medium such that the image can remain stationary at least in a main scanning direction in a relative relation to the recording medium.

Preferably, the group of two-dimensionally disposed light source elements is produced by a two-dimensional spatial light modulator illuminated with an illumination light flux.

DETAILED DESCRIPTION OF THE INVENTION

An image recording method and an image recording apparatus of the present invention will be described below in detail with reference to preferable embodiments shown in the accompanying drawings.

Figure 1:
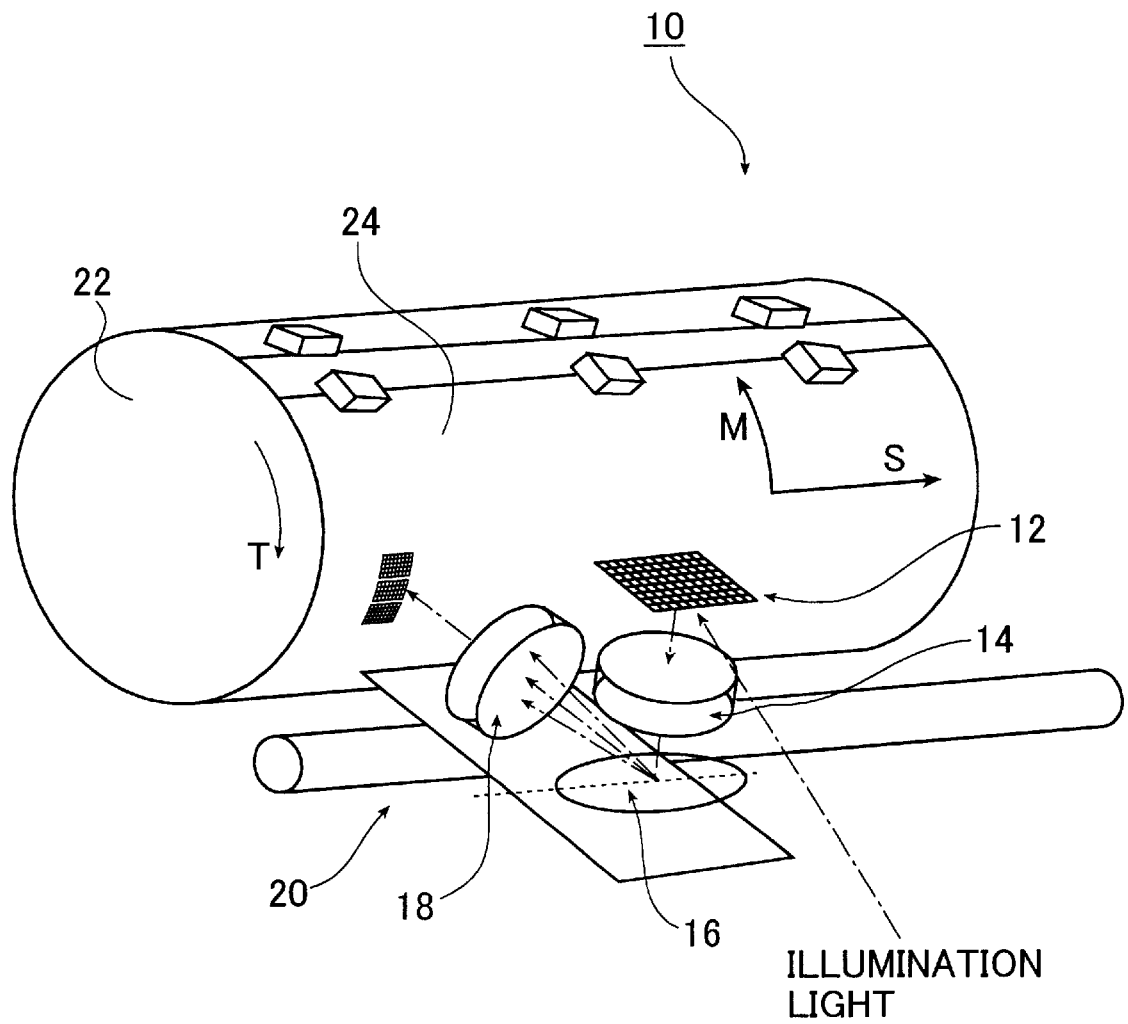
FIG. 1 is a perspective view showing the schematic arrangement of an embodiment of an image recording apparatus according to the present invention.

FIG. 1 is a perspective view showing the schematic arrangement of an embodiment of the image recording apparatus according to the present invention.

The illustrated image recording apparatus 10 is an apparatus for recording an image by two-dimensionally scan-exposing a recording medium using an array of reflecting light source elements produced in a two-dimensional spatial light modulator (2DSLM) such as a micro mirror array (hereinafter, referred to as "MMA") or a two-dimensional mirror array device (2DMAD) as so-called Digital Micromirror Device™ (DMD) by illumination with an illumination light flux and a so-called external drum (external surface drum). In the illustrated embodiment, the array of reflecting light source elements produced by means of the MMA illuminated with the illumination light beam denotes a group of two-dimensionally disposed light source elements of the present invention.

In FIG. 1, the image recording apparatus 10 includes a light source so-called a large or broad area light source (not shown), a MMA 12 for receiving illumination light emitted from the light source, a collimator lens (light collimator) 14, a light deflector 16, a focusing (or imaging) lens 18, an auxiliary scanning drive system 20, and an external drum (outer drum) 22 (hereinafter simply referred to as "drum" 22). Further, the drum 22 has a recording medium 24 wound around the outside surface thereof.

While not shown, various types of light sources, for example, so-called large or broad area light sources can be used in accordance with the spectral sensitivity of the recording medium used as long as they can emit a sufficient quantity of light. For example, a ultra-high pressure mercury lamp, a metal halide lamp, and the like may be used as the light source when a plate-making film and a conventional PS plate which are sensitive to visible light and ultraviolet light, are used as the recording medium.

Further, an infrared broad area laser diode may be used in the case of a heat mode plate which is sensitive to infrared light. In addition to the above, a LED, a halogen lamp, a xenon lamp, and the like may also be used in accordance with the recording medium used.

The MMA 12 is a two-dimensional spatial light modulator in which rectangular micromirrors capable of rotating (swinging) a predetermined angle about a predetermined rotation axis are two-dimensionally disposed. The electrostatic rotation of the micromirrors modulates light by activating and deactivating each micromirror (=pixel) for exposure. The MMA 12 is formed on a silicon chip by a micromachine technology making use of a process for manufacturing a semiconductor device.

The MMA 12 used in the image recording apparatus 10 of the illustrated case has 1024×1280 pixels with intervals therebetween set to 17 $\mu$m. Further, respective components are disposed such that the rotational direction (shown by an arrow T in FIG. 1) of the drum 22 to be described later, can optically agree with the direction of the pixel train of the 1024 pixels of the MMA 12 (hereinafter, the direction shown by an arrow M in FIG. 1 is referred to as a "main scanning direction") and that the axial direction of the drum 22 can optically agree with the direction of the pixel train of the 1280 pixels of the MMA 12 (hereinafter, the direction shown by an arrow S in FIG. 1 is referred to as an "auxiliary scanning direction").

Note that the spatial light modulator of two-dimensional arrangement used in the present invention is not limited to the MMA 12 of the illustrated case, and various types of modulators such as liquid crystal type, PLZT type, EO (electrooptical) type and AO (acoustooptic) type can be used. However, the MMA is most preferable among them from the view point of a modulation speed, an efficiency for light utilization, and the like.

Further, a surface emitting laser or a LED array in which light emission points are disposed two-dimensionally, can be used as a two-dimensional array-like light source.

The collimator lens 14 is used to allow the light reflected by the MMA 12 to be incident on the light deflector 16 as collimated light.

The light deflector 16 deflects the light incident through the collimator lens 14 in the main scanning direction M in synchronism with the rotation of the drum 22. That is, the light deflector 16 is driven by a drive unit (light deflector driver) not shown in FIG. 1 and changes the direction of light in synchronism with the rotation of the drum 22 so that the image data of one frame is imaged at the same position on the recording medium 24 even if the drum 22 rotates. Preferred examples of the light deflector 16 include a galvano-scanner (galvano-meter mirror), a polygonal mirror, a piezo system, and devices for shifting lenses (including also the ones for shifting the collimator lens 14 and the focusing lens 18).

Further, the focusing lens 18 images the light deflected by the light deflector 16 at a predetermined position on the recording medium 24 wound around the drum 22.

The light reflected by the MMA 12 is finally imaged on the surface of the recording medium 24 held on the surface of the drum 22. Examples of the recording medium 24 include a light mode sensitive material and a heat mode sensitive material. Further, the recording medium is not particularly limited and may be a film or a plate.

The (external) drum 22 is a cylinder which holds the recording medium 24 on the outside surface thereof and rotates in the direction shown by the arrow T in FIG. 1 about an axis.

Figure 2:
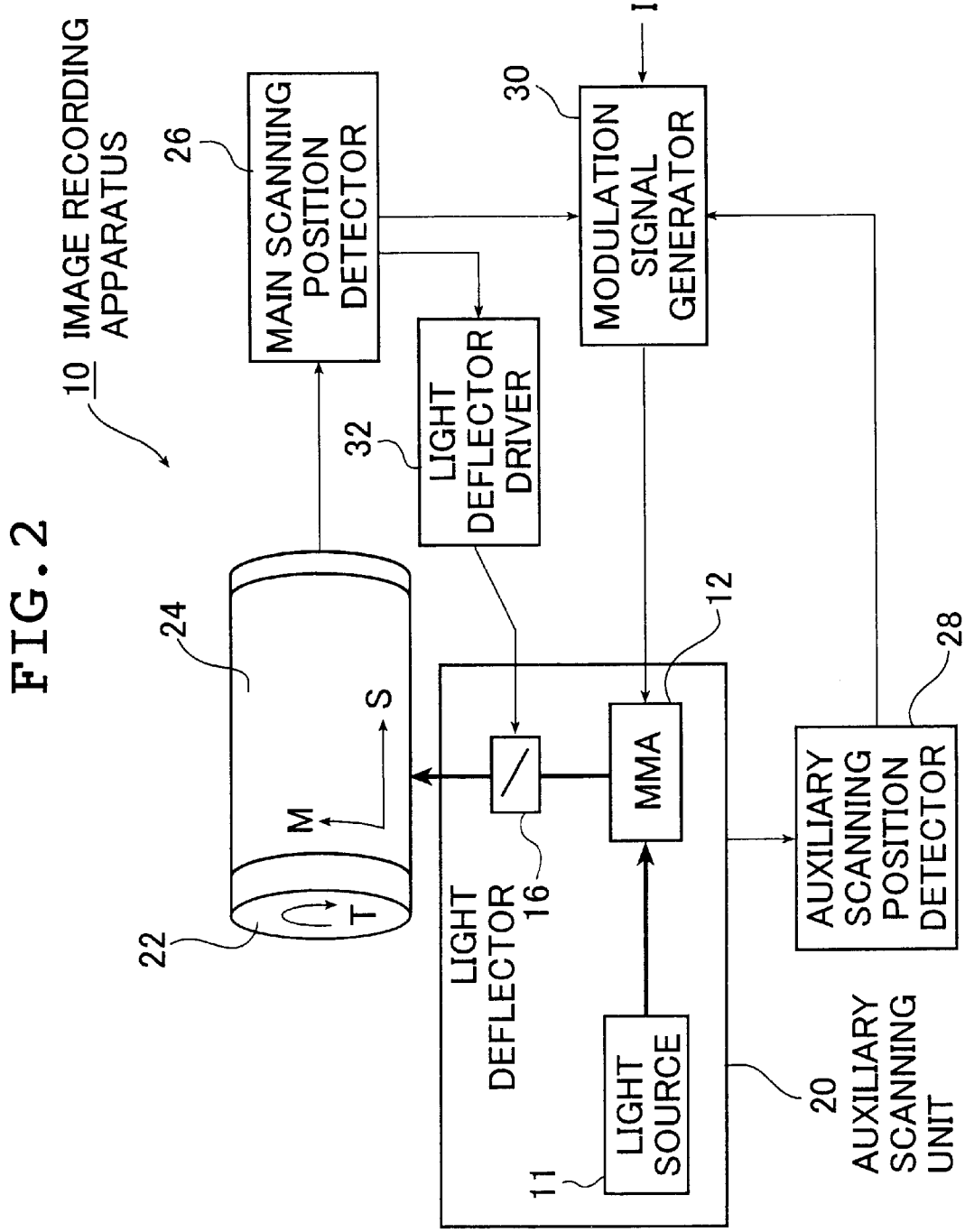
FIG. 2 is a block diagram showing the control system of recording timing of the image recording apparatus according to the embodiment under consideration.
Figure 3A:
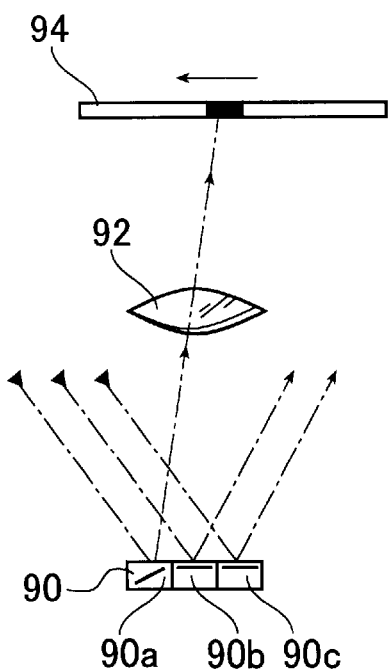
FIGS. 3A, 3B and 3C are views explaining the principle of an image recording method using a conventional spatial light modulator.
Figure 3B:
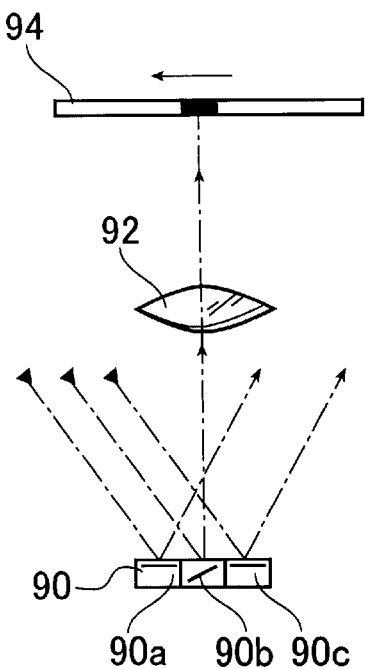
Figure 3C:
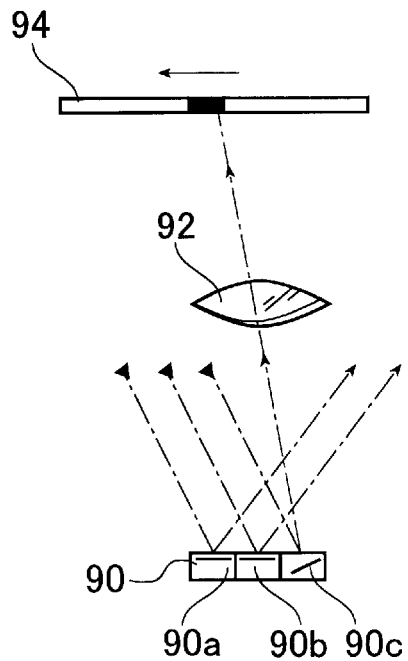

The optical system including the light source denoted by reference numeral 11 in FIG. 2, the MMA 12, the collimator lens 14, the light deflector 16, and the focusing lens 18 is integrated together as a unit and moved by an auxiliary scanning drive system 20 at a predetermined speed in the auxiliary scanning direction (the direction shown by the arrow S in FIG. 1).

Further, FIG. 2 shows a block diagram of the control system of recording timing of the image recording apparatus 10 according to the embodiment under consideration.

FIG. 2 shows a control system for controlling the various components added to the arrangement shown in FIG. 1.

As shown in FIG. 2, the optical system such as the light source 11, the MMA 12 and the light deflector 16 (the collimator lens 14 and the focusing lens 18 are not shown in FIG. 2) are integrated together on the auxiliary scanning drive system (auxiliary scanning unit) 20 and can move at a predetermined speed in the auxiliary scanning direction S.

While the light deflector 16 deflects the light reflected (modulated) by the MMA 12 in the main scanning direction M in synchronism with the rotation of the drum 22 as described above, a main scanning position detector 26 is disposed for the drum 22 to control the timing of the deflection. For example, a rotary encoder which detects a rotational position of the drum 22, can be used as the main scanning position detector 26.

An auxiliary scanning position detector 28 is disposed for the auxiliary scanning drive system 20 to detect an auxiliary scanning position.

Further, a modulation signal generator 30 is disposed for the MMA 12 to send the image data of each frame to the MMA 12 while changing the control pattern in the MMA 12.

An image signal is supplied to the modulation signal generator 30, modulated based on the detection signals from the main scanning position detector 26 and the auxiliary scanning position detector 28 and then sent to the MMA 12.

Further, a light deflector driver 32 for driving the light deflector 16 is disposed for the light deflector 16. The light deflector driver 32 drives the light deflector 16 based on the detection signal from the main scanning position detector 26 so that the light reflected by the MMA 12 can be deflected in the main scanning direction in synchronism with the rotation of the drum 22.

The operation of the image recording apparatus 10 of the embodiment under consideration will be described below with reference to FIG. 2.

In this embodiment, when one image (an overall image to be recorded on a single recording medium) is recorded, the overall image is divided into small segments each referred to as a frame. The size of one frame is determined by the possible number of pixels of the MMA 12. As described above, the number of pixels of the MMA 12 in this embodiment is 1024×1280, which represent the size of one frame in this case.

When an image is to be recorded, first, image signal of a first frame in the image is sent from the modulation signal generator 30 to the MMA 12, and the respective micromirrors of the MMA 12 are controlled for activating and deactivating in accordance with the data sent to the MMA 12. When illumination light from the light source 11 impinges on the MMA 12, recording light that carries the image data of the first frame represented by the image signal can be obtained.

The light is imaged on the recording medium 24 held on the surface of the rotating drum 22 through the optical system including the collimator lens 14, the light deflector 16 and the focusing lens 18.

The drum 22 rotates in the direction shown by the arrow T in FIG. 1 at a constant speed. The light deflector 16 is driven by the light deflector driver 32 in synchronism with the speed of the drum 22 to deflect the light in a direction opposite to the main scanning direction M, so that the image of one frame on the recording medium 24 cannot be moved but remains stationary. Then, the image of one frame is recorded (exposed) while the drum 22 rotates an angle corresponding to one frame, that is, 1024 pixels or less in the direction opposite to the main scanning direction.

As described above, in the image recording method performed by the image recording apparatus of this embodiment, image exposure is performed by moving an image to be formed on the recording medium 24 in synchronism with the movement of the drum 22 so that the image can remain stationary on the recording medium 24. Thus, this image recording method is of a so-called tracking scan exposure type.

When the main scanning position detector 26 detects that the drum 22 has rotated an angle corresponding to one frame or less, the light deflector 16 is returned to its original position. The MMA 12 is deactivated during this operation, and the image signal of the next frame is sent from the modulation signal generator 30 to the MMA 12 so that the image signal of the MMA 12 can be changed. Then, the image of this frame is recorded while the drum 22 rotates an angle corresponding to one frame or less as in the first frame. Subsequently, the same operation is repeated. Image recording is continued until the drum 22 rotates once, and then the optical system is moved by one frame in the auxiliary scanning direction S by the auxiliary scanning drive system 20 and image recording is repeated in the same manner.

As described above, in the image recording method of the embodiment under consideration, an image to be formed on the recording medium 24 which moves (rotates) continuously, also moves continuously in synchronism with the movement of the recording medium 24. Accordingly, the pixel size of the recorded image is not increased due to image flow.

Further, in this embodiment, since the image is moved by deflecting light by the light deflector 16 in synchronism with the rotation of the drum 22, a complicated signal processing circuit which has been conventionally employed for image movement, is not necessary.

Furthermore, while an image of one frame (1024×1280 pixels) is recorded, the MMA 12 carries the image data of the one frame. Thus, image signaling need only be changed once when the image of the one frame is recorded. In the conventional method however, it is necessary to change image signaling 1024 times when the number of pixels in the main scanning direction is 1024. Therefore, according to this embodiment, restrictions are reduced by a factor of 1024 (in general, by a factor of N when the number of pixels in the main scanning direction is N), which enables image recording 1024 times (in general, N times) as fast as the conventional method and hence improvement of the productivity.

Although the external surface scan system using the external drum is employed as a system for relatively moving the MMA (spatial light modulator of two-dimensional arrangement (2DSLM)) and the recording medium, this is not the sole system in the embodiment under consideration and an internal surface scan system for recording an image by holding a recording medium on the internal surface of a drum and a flat surface scan system for recording an image on a flat recording medium may be employed.

Further, while the light emitted from the illumination light source is modulated by the spatial light modulator of two-dimensional arrangement such as the MMA or 2DMAD in the above embodiments, a two-dimensional array-like light source such as a surface emitting laser or a LED array may be used as the group of two-dimensionally disposed light source elements of the present invention in place of the combination of the light source with the spatial light modulator. Further, an illumination light source which includes a white light source such as a halogen lamp and a color filter, may be combined with the spatial light modulator.

Furthermore, modulation may be performed on a pixel basis to change the densities on a pixel basis thereby providing finer gradation. Alternatively, image densities may be unified for each frame on a recording medium.

While the image recording method and the image recording apparatus of the present invention have been described above in detail, the present invention is by no means limited to the above embodiments and it is needless to say that various improvements and modifications can be made within the range which does not depart from the gist of the present invention.

As described above, the present invention has excellent effects in that the pixel size is not increased after recording and that any complicated signal processing circuit is not necessary for image movement, since an image to be recorded is made stationary in a relative relation to a moving recording medium.

In addition, the system including a two-dimensional spatial light modulator and a light source for illuminating this light modulator enables image recording of high resolution even when the light source is various types of large or broad area light sources and also has an effect of reducing the number of times for changing image signaling to be delivered to a group of two-dimensionally disposed light source elements, thus improving the productivity.

What is claimed is:

1. An image recording method in which a two-dimensional image formed by a group of two-dimensionally disposed light source elements is focused through an optical system on a recording medium which is moving in a relative relation to said group of two-dimensionally disposed light source elements, comprising the step of:

deflecting light from said group of two-dimensionally disposed light source elements in a direction opposite to a main scanning direction to move the image focused on said recording medium in synchronism with a movement of said recording medium such that said image can remain stationary at least in the main scanning direction in a relative relation to said recording medium.

2. The image recording method according to claim 1, wherein said group of two-dimensionally disposed light source elements is produced by a two-dimensional spatial light modulator illuminated with an illumination light flux.

3. An image recording apparatus, comprising:

a group of two-dimensionally disposed light source elements;

a recording medium which moves in a relative relation to said group of two-dimensionally disposed light source elements; and an optical system which focuses an image formed by said group of two-dimensionally disposed light source elements on said recording medium, wherein said optical system includes a light deflector for deflecting light from said group of two-dimensionally disposed light source elements in a direction opposite to a main scanning direction, and said light deflector deflects the light to move the image focused on said recording medium in synchronism with a movement of said recording medium such that said image can remain stationary at least in the main scanning direction in a relative relation to said recording medium.

4. The image recording apparatus according to claim 3, wherein said group of two-dimensionally disposed light source elements is produced by a two-dimensional spatial light modulator illuminated with an illumination light flux.

5. The image recording apparatus of claim 4, wherein the two-dimensional spatial light modulator comprises a micro mirror array.

6. The image recording method of claim 1, wherein the recording medium is disposed on a rotating drum, and said main scanning direction comprises the direction opposite to the direction of rotation of the drum.

7. The image recording apparatus according to claim 3, wherein the recording medium is disposed on a rotating drum, and said main scanning direction comprises the direction opposite to the direction of rotation of the drum.

8. The image recording apparatus of claim 4, wherein a broad area light source providing illumination along first and second dimensions of the spatial light modulator provides the illumination light flux.

9. The image recording apparatus according to claim 8, wherein the recording medium is disposed on a rotating drum, and said main scanning direction comprises the direction opposite to the direction of rotation of the drum.

10. The image recording method of claim 1, wherein the group of two-dimensionally disposed light source elements comprises an array of LEDs.

11. The image recording apparatus of claim 3, wherein the group of two-dimensionally disposed light source elements comprises an array of LEDs.

* * * * *